Aug. 13, 1940.   A. P. RIPPENBEIN   2,211,164
COLLAPSIBLE BICYCLE
Filed Dec. 23, 1937
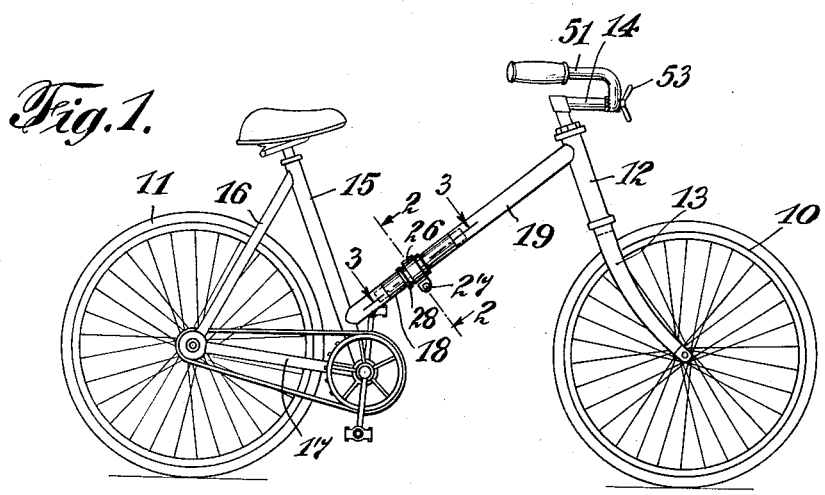
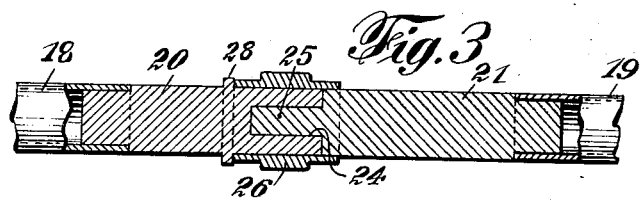
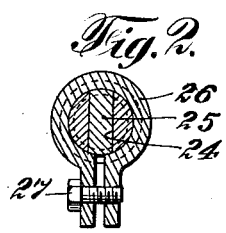
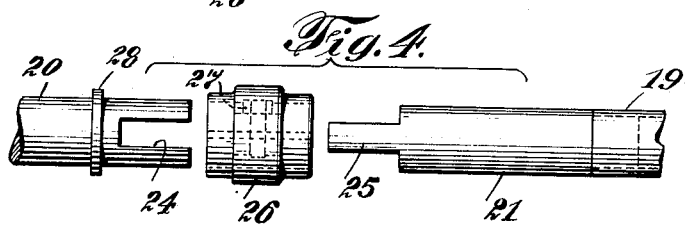
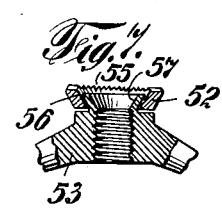
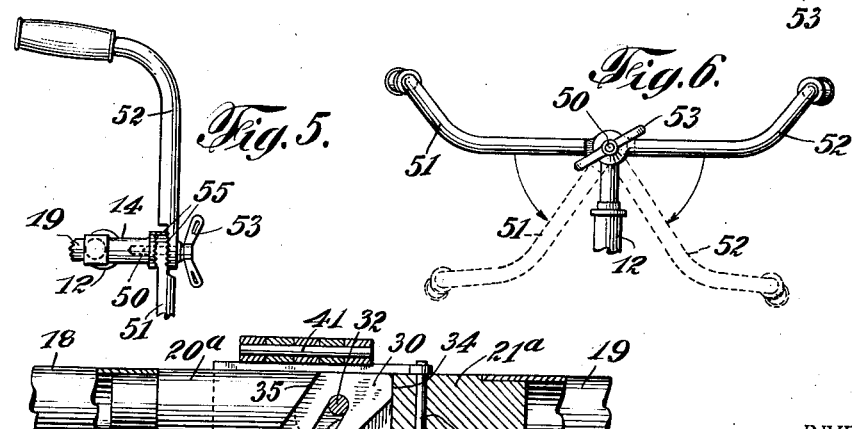
INVENTOR.
Albert P. Rippenbein
BY Ramsey, Kent, Chisholm & Lutz
his ATTORNEYS Patented Aug. 13, 1940

2,211,164

UNITED STATES PATENT OFFICE 2,211,164

COLLAPSIBLE BICYCLE

Albert P. Rippenbein, New York, N. Y., assignor to The Bicycle Built-In-Two, Inc., New York, N. Y., a corporation of New York Application December 23, 1937, Serial No. 181,285

6 Claims. (Cl. 280—287)

This invention relates to and has for its object the improvement of collapsible bicycles.

The constructions used heretofore have been unduly complicated and/or not well adapted for enabling the bicycle to be placed in a small crate or case.

According to the present invention the front wheel and its fork can be completely separated from the rear wheel and its forks, so that the two wheels can be placed side by side in a manner not possible when a single hinged joint is used. Further, the handles are mounted so that they can be swung downwards into a position nearly parallel with the front wheel. The result of the use of these features is that the entire bicycle may be packed in a case measuring only 36 x 28 x 12 inches.

By using a single cross bar extending from a point near the bottom of the seat pillar to the steering pillar only one joint is necessary. The result is that the construction is greatly simplified, and at the same time a bicycle is produced which may be used equally well by women as by men. However, the improved form of joint herein described is adapted for use with bicycles having both upper and lower cross bars. In this case, an additional joint of suitable construction must be provided in the upper cross bar.

Other advantages of the invention will be set forth in connection with the description of two suitable forms of construction illustrated, by way of example, in the accompanying drawing, wherein:

Fig. 1 is a side elevation of a bicycle embodying the features of the present invention;

Fig. 2 is a section on the line 2—2 of Fig. 1;

Fig. 3 is a section on the line 3—3 of Fig. 1;

Fig. 4 is a top plan view of the joint with the parts separated;

Fig. 5 is a top plan view of the handlebars in extended position;

Fig. 6 is a front elevation of the handlebars, showing in full lines one position and in dotted lines another position thereof;

Fig. 7 is a section through the wing-nut and the end of the handlebar section to which it is permanently, but rotatably, connected; and Fig. 8 is a longitudinal section through a modified form of joint.

The bicycle shown comprises front and rear wheels 10 and 11, and a frame comprising a steering pillar 12, front forks 13, handlebar support 14, seat pillar 15, rear forks 16 and 17, and a single connecting cross bar formed of two sections 18 and 19.

As only one cross bar is used, it is subjected not only to heavy vertical and lateral stresses, but also to torsional stresses. For this reason an exceptionally strong joint is required. Tubes are very strong if properly supported at their ends against collapse or distortion. Further, the strength of a tube is dependent on maintenance of the complete tubular structure and is decreased enormously by slotting the tube or by cutting half of it away to form a semi-cylindrical channel. Accordingly, the joint comprises two solid plugs 20 and 21 having interlocking parts at one end and having their opposite ends inserted into the ends of the cross bar sections 18 and 19, respectively. These engaging end portions of the plugs and cross bar sections are welded or brazed together.

The plug 20 has a vertical slot 24 in its upper end for the reception of a tongue 25 extending from the lower end of the plug 21. After the tongue has been inserted in the slot, a clamp 26 is slipped down the cross bar section 19 over the engaging parts and the bolt 27 tightened. A collar 28 on the plug 20 arrests downward movement of the clamp when the latter has reached its proper position. To ensure a good clamping action it is desirable that the upper end of the plug 20 along the outer two-thirds of the slot 24 is of slightly larger diameter than the upper end of the plug 20 adjacent the base of the slot and also larger than the lower end of the plug 21 so that the entire pressure of the clamp is exerted in forcing the walls of the slot 24 against the two faces of the tongue 25.

Relative movement between the two cross bar sections 18 and 19 in a vertical plane is restrained solely by the clamp 26 and the frictional forces created thereby. In the modification shown in Fig. 8, such relative movement is prevented more positively. In that construction, a tongue 30 extending from plug 20ª is provided with an open ended slot 31 for engagement with a pin 32 passing across the slot 33 in the other plug 21ª. To bring the tongue into engagement with the pin 32, the two parts of the frame are brought together in such relative positions that the plug 20ª is inclined downwardly with respect to the plug 21ª, so that the slot 33 is disposed in a substantially vertical position. The rear half of the frame is then dropped to bring the pin 32 to the top of the slot 33, and then turned upwardly about the pin as a pivot. As the plug 20ª swings upwardly and moves into alignment with the plug 21ª, the end of the tongue 30 abuts against the bottom of the slot at 34 and prevents further relative movement. Also, the end of the plug 21ª is beveled at 35, and the parts of the plug 20ª on either side of the base of the tongue 30 are correspondingly beveled for mutual engagement when the two plugs move into alignment. As the stresses due to the weight of the rider and bicycle are directed downwardly, such stresses and strain cause the parts to engage at 34 and 35 in such positive fashion as to prevent any tendency for the parts to separate, whether the clamp is in proper operative position or not.

The clamp 26 of the first form of construction is separable from both halves of the frame and is, therefore, apt to be mislaid and lost. If the clamp is to be permanently connected to one or other of the frame members and a pin-and-slot joint is used, as is shown in Fig. 8, the clamp must be capable either of sliding or else folding out of the way. In the construction of Fig. 8, the folding method is used.

As shown, the clamp 40 is formed of two semi-cylindrical parts, hingedly connected at 41. The opposite edges are drawn together by a bolt 42. One part of the clamp is permanently, though pivotally, connected to the plug 21ᵃ by a pin 43, so that by loosening bolt 42, and folding back the free half of the clamp, the latter as a whole can then be swung around pin 43 as a pivot, away from the joint, to allow it to be made or broken, as the case may be.

The handlebars are constructed so that they can be adjusted angularly in a vertical plane to vary the height of the handles, but more particularly to enable the handlebars to be folded downwardly more or less into the plane of the frame, so as to facilitate the packing of the bicycle in a case or crate.

The handlebar support 14 has a forwardly and horizontally extending stud 50 which passes through apertures in the inner ends of the handlebars 51 and 52. The end of the support 14 and the ends of the handlebars 51 and 52 are radially serrated as at 55 for mutual engagement in a plurality of angular positions. A wing nut 53 clamps these ends in adjusted position. To prevent accidental misplacement and consequent loss, the wing nut is permanently connected to the handlebar 52. This is conveniently accomplished by making the aperture in the end of the bar 52 over size and conical, as shown at 56 in Fig. 7. The wing nut is formed with a tubular extension 57 which is inserted in such aperture and then flared out to prevent its subsequent withdrawal.

From the foregoing it will be seen that the present arrangement provides a bicycle so constructed as to be separable into two sections which are of such similar over-all dimensions as to permit the sections to be packed side-by-side in a relatively small space. To this end, if desired, the pedals may be made in such fashion as to be capable of being folded into position close to the frame portion to which they are attached. Moreover, the arrangement as disclosed herein is of such simplified form that a minimum of time and effort is required to assemble the parts into operative condition or to separate the same for packing and the like. The type of bicycle shown herein, that is, a bicycle made up of two parts which are completely separable has advantages over types of bicycles in which parts are hingedly connected. For example, if desired, the two parts of the present bicycle can be carried separately with a consequent reduction in weight to be lifted by the user at a particular time. Also the two sections can be encased in separate containers so that, again, the weight which must be lifted at any particular time can be materially reduced. Such separate handling of the parts necessarily permits easier transportation of the complete device. Another advantage inherent in this structure consists in the ease and rapidity with which the parts can be assembled or separated.

With the type of handle bar construction shown, it will be apparent that the handle bar can be shifted in such fashion as to assume either the normal riding position or the inverted racing position.

It is to be understood that changes beyond the illustrated embodiments can be made without departing from the scope of the invention in view of which any limitations imposed thereupon are to be only those set forth in the following claims.

What is claimed is:

1. In a collapsible bicycle, having a seat pillar and a steering pillar, a cross bar in two separable sections extending from a point near the bottom of the seat pillar to the steering pillar, one end of one of said sections being forked, a pin extending between the legs of said fork, a vertically arranged tongue on the end of the other section to fit between said legs, said tongue being provided with a slot inclined relative to the axis of its section whereby said pin can be introduced into said slot when the sections are in angular disposition, said sections being rotatable with the pin engaged to full limit in said slot to bring the sections in axial alignment, said sections having cooperating formations preventing further relative rotation thereof.

2. A collapsible bicycle as in claim 1 provided with releasable means for holding said sections against out-of-alignment movement.

3. In a collapsible bicycle having a seat pillar and a steering pillar, a cross bar in two separable sections extending from a point near the bottom of the seat pillar to the steering pillar, one end of the section secured to the steering pillar being forked, a pin extending between the legs of said fork, a vertically arranged tongue on the end of the other section to fit between said legs, said tongue being provided with a slot inclined at an acute angle relative to the axis of its section whereby said slot can be engaged with said pin when the sections are in angular disposition, said sections being movable with the pin engaged to full limit in said slot to bring the sections in axial alignment, said sections having cooperating formations preventing further relative rotation thereof.

4. A collapsible bicycle as in claim 3 provided with releasable means for holding said sections against out-of-alignment movement.

5. In a collapsible bicycle having a seat pillar and a steering pillar, a cross bar in two separable sections extending from a point near the bottom of the seat pillar to a point near the top of the steering pillar, one end of the section secured to the steering pillar being forked, a pin extending between the legs of said fork, a vertically arranged tongue on the end of the other section to fit between said legs, said tongue being provided with a slot inclined at an acute angle relative to the axis of its section whereby said pin can be introduced into said slot when the sections are in angular disposition, said sections being rotatable with the pin engaged to full limit in said slot to bring the sections in axial alignment, said sections having cooperating formations preventing further relative rotation thereof.

6. A collapsible bicycle as in claim 5 provided with releasable means for holding said sections against out-of-alignment movement.

ALBERT P. RIPPENBEIN.